Patented Jan. 29, 1946

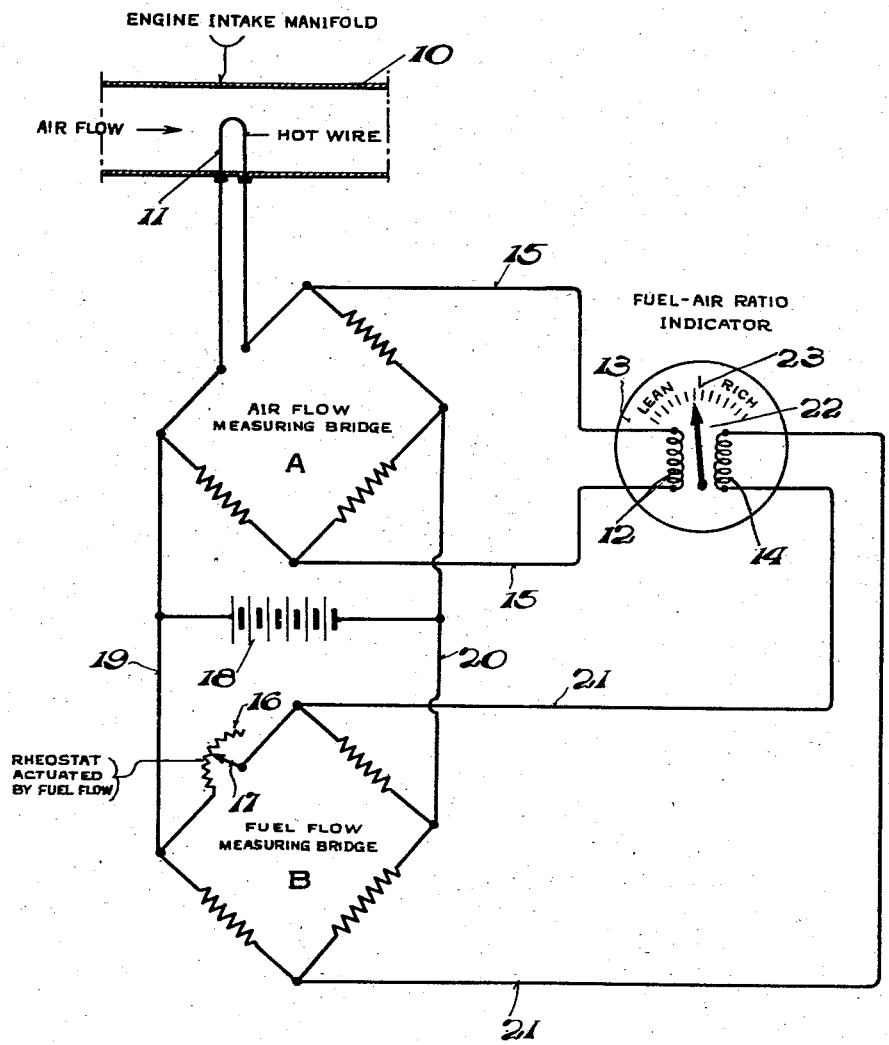

2,393,708

UNITED STATES PATENT OFFICE 2,393,708

FUEL AIR RATIO METER

Wladimir A. Reichel, Hackensack, N. J., assignor to Bendix Aviation Corporation, Teterboro, N. J., a corporation of Delaware Application June 23, 1943, Serial No. 491,991

5 Claims. (Cl. 73—196)

The present invention relates to measuring instruments and more particularly to fuel and air ratio meters for combustion engines.

To obtain efficient combustion in aircraft, automotive and other internal combustion engines, requires a highly skilled mechanic to determine the proper ratio of air and fuel. Even the most skillful mechanic, however, cannot properly proportion the relative amounts of air and fuel necessary for maximum efficient combustion without several tests with relative air and fuel adjustments.

With the present invention there is provided a single fuel and air ratio indicator, which will respond instantly to give proportional indications of either air or fuel to either side of a pre-calibrated and tested maximum efficiency combustion fuel-air ratio point. Since this pre-calibrated maximum efficiency point has been determined by a skilled combustion engineer, all that is now necessary is for any inexperienced individual to adjust the relative proportions of air and fuel by any suitable means provided, until the instrument needle automatically adjusts itself to the maximum combustion efficiency indicating point.

Accordingly, an object of the invention is to provide a device not requiring super-mechanics or combustion engineers to determine air and fuel proportions for maximum combustion efficiency of internal combustion engines.

Another object is to indicate with one instrument the maximum air and fuel ratio from two separate sources.

Another object is to provide a novel combination of circuits associated with a ratio meter responsive to both or either of the combination of associated circuits to indicate a change of current potential in either circuit.

Yet another object is to provide a ratio meter adapted to indicate unsatisfactory combustion efficiency ratios on a pre-calibrated scale by units in terms of leanness or richness of the fuel charge and/or the mean maximum efficiency point of the fuel charge.

In the practice of my invention, I may use a system as illustrated in the accompanying drawing. It is to be understood, however, that the scope of this invention shall be determined by reference to the following specification and claims and not to the specific schematic diagram.

Referring in detail to the drawing, numeral 10 indicates an intake manifold with a suitable resistance, such as hot wire loop 11 housed therein.

Hot wire 11 is one resistance arm of a Wheatstone bridge circuit A, which circuit A has connected across the same by lines 15 at the normal null or balance points, which are diagonal or opposite an induction coil 12.

Induction coil 12 provides one side of a mutual inductance field in indicator instrument 13, which mutual inductance field also includes induction coil 14.

Coil 14 is similarly connected across the null points, by lines 21, of another Wheatstone bridge circuit B, wherein one arm includes a rheostat comprising resistor 16 and a fuel flow actuated oscillator element 17 to control the resistance and the flow of current to the inductance coil 14 at the variable or adjustable resistance 16 in accordance with or proportional to the increase or decrease, that is degree or volume of fuel flow and responsive movement of the element or armature 17, as by a valve or any other suitable measuring means in accordance with the proportionate volumes of air and fuel flowing to the engine manifold.

The air core or other transformer inductance coils 12 and 14 are provided with a suitable source of power, such as battery 18 connected in parallel across connector lines 19 and 20, with bridge circuits A and B. The power source 18, so connected, provides for a normal potential of current in coil 12 equal to that of coil 14. This mutual balance of current potential serves to retain indicator needle 22 of indicator instrument 13, which may be magnetized, at the central maximum efficiency pre-calibrated combustion (fuel and air ratio) point or preferred position between the coils 12 and 14 on the scale 23 calibrated to indicate such central point and degrees or proportions of lean and rich mixtures, until the heat rate is varied by an increase or decrease in air flow around hot wire 11 in one resistance arm of bridge A, connected to coil 12, or by an increase or decrease in fuel flow adapted to shift element 17 on resistor 16 connected to coil 14 or adjustable resistance in one resistance arm of bridge B, which is connected to and operated by a fuel measuring means or valve actuated in accordance with the degree or volume of fuel flow in proper proportion to the air flow.

Operation

The operation of the measuring system is responsive to air flow through intake manifold 10 and to fuel flow through an intake fuel line valve, not shown, associated with rheostat arm 17.

Battery 18 is so connected as to balance circuits A and B by an equal distribution of power to each bridge circuit. It follows that coils 12 and 14 are also energized by the equally distributed source of power, so that magnetic needle 22 is normally held by the balanced or equal magnetic circuits or fields about the transformer or spaced opposed coils 12 and 14 or current potential or voltage therein at null position. Null position indicates maximum combustion efficiency in terms of air-fuel ratio.

Assuming that the engine is operating and air flows through intake 10 around hot wire or resistance 11 and that fuel passing through the fuel measuring means or valve to the carburetor and then into the engine intake manifold to properly mix with the air therein is controlling arm 17 with respect to resistance 16 at the proper ratio of air and fuel admitted into the manifold, then needle 22 will remain at null position, because each inductance coil 12 and 14 are mutually energized by balanced current potential.

Now assuming that there is an undesirable increase in air flow around resistance 11; then the heat rate is dissipated at a faster rate than it is produced, so as to unbalance and lower the resistance value in wire 11 and the voltage in coil 12 so that the magnetic circuit flux or field is increased over the voltage or magnetic circuit flux in the coil 14 in proportion thereto, whereupon magnetic indicator needle 22 is pulled toward coil 12 on the lean side of scale 23 in proportion to the difference between the respective voltages set up in inductance coils 12 and 14.

A substantially similar but reverse actuation of needle 22 occurs for rich mixture indications, when the flow of fuel supply increases and proportionally reduces the resistance value through the rheostat arm 17 and resistance 16 in bridge circuit B by correspondingly shifting the fuel flow actuated oscillator element, armature or wiper arm 17 to increase the voltage in coil 14 over that in the coil 12.

It will thus be seen that there is provided a device in which the several objects of the invention are achieved, and which is well adapted to meet the conditions of practical use.

I claim:

1. A fuel-air ratio meter comprising an indicator scale, means having a pair of spaced opposed inductance coils, a pointer pivoted in the air space between said coils and movable from a normally central position to either side thereof to indicate a lean or rich mixture of fuel and air, a pair of Wheatstone bridges connected at diagonal points of each with a source of electrical energy in parallel therewith and connected at other diagonal points of each to one of said inductance coils, one arm of one bridge having a hot resistance wire extending into an engine intake manifold and exposed to the air flow therethrough and adapted to vary the resistance thereof in proportion to said air flow, and a rheostat in one of the arms of the other bridge and having a movable sweep arm actuated in proportion to volume of fuel flow to said engine and varying the resistance thereof in proportion to said fuel flow, whereby variation of the resistances in said bridges will unbalance the magnetic fields about said inductance coils in proportion to the ratio of the flow of air and fuel to indicate a lean or rich mixture.

2. A fuel ratio meter comprising an indicator scale having a central maximum efficiency calibration point for fuel and air mixture ratio, a pair of opposed spaced inductance coils having normally balanced magnetic fields, a movable pointer centrally positioned between said coils when said fields are balanced and adapted to be pulled to either side upon unbalancing thereof to indicate a lean or rich mixture, a pair of bridges each connected at the diagonal points thereof to a coil, a source of electrical energy connected to other diagonal points of said bridges, one arm of one bridge having a hot wire interposed therein to extend into an engine intake manifold to vary the resistance in said wire according to the rate of dissipation of the heat therein by the air flow in said manifold, and an adjustable resistance in one of the arms of the other bridge and having a movable member controlled by the flow of fuel to the manifold, to vary said adjustable resistance in proportion to the richness of the mixture, the magnetic fields about said inductance coils being unbalanced and varied in proportion to the variation in resistance in the hot wire and adjustable resistance in proportion to the ratio of the volume of fuel flow to the volume of air flow, whereby the pointer will be pulled toward one coil or the other to indicate a lean or rich mixture.

3. A fuel ratio meter for an internal combustion engine comprising an indicator scale, a pair of opposed inductance coils, a pair of bridge circuits, each bridge circuit being connected at opposite points thereof to one of said coils, a common source of electrical energy connected in parallel with each bridge circuit at opposite points thereof intermediate the points of connection of the coils therewith, one arm of one bridge circuit including a resistance element automatically variable in proportion to air flow to the engine and exposed thereto, one arm of the other bridge circuit including a resistance and a fuel flow actuated oscillator element cooperating therewith to automatically vary the last-named resistance in proportion to fuel flow to the engine, to vary the current potential in said inductance coils, and an indicator needle movable between said inductance coils and normally held thereby in a central position when said potential in the coils is balanced but adapted to be pulled to either side upon the unbalancing of said potential in proportion to the ratio of air and fuel flow.

4. An air and fuel ratio meter system for an internal combustion engine having an air intake manifold, comprising a source of current, a Wheatstone bridge connected to said source of current, a pair of opposed spaced mutual inductance field coils, one of said coils being connected across said bridge at opposite points thereof, one of the arms of the bridge having a resistance wire interposed therein and extending into the engine air intake manifold, a second Wheatstone bridge also connected to said source of current and the first bridge, the other coil being connected to the second bridge at opposite points thereof, a rheostat adapted to be actuated by the flow of fuel to said engine, said rheostat being interposed in one of the arms of the second bridge to vary the resistance therein in proportion to the fuel flow to said engine, a scale adjacent said coils and a pointer pivoted between said coils and cooperating with the scale in a normally null position between the inductance coils and moved to either side upon the unbalancing of the circuits to said coils in proportion to the ratio of air and fuel flow.

5. An indicating instrument for an internal combustion engine, including a suitable source of electrical energy, a pair of spaced opposed mutual inductance coils, a magnetic needle associated with the coils, a scale over which said needle moves to indicate lean and rich mixtures and having a central point indicating maximum efficiency air fuel ratio to which said needle normally points due to balancing of the mutual inductances in said coils, a Wheatstone bridge including a resistance in at least one of its arms varied by air flow to the engine and disposed in circuit at opposite points with one of said inductance coils, and a second Wheatstone bridge including a resistance in at least one of its arms varied by fuel flow to the engine, said bridges and resistances being normally of equal impedance value, the second bridge being connected at opposite points to the other of said coils, said source of electrical energy being connected in parallel with said bridges at other opposite points thereof to produce equal voltage in each of said inductances coils, whereby upon variation in said resistances, the voltages in said inductance coils will be unbalanced in proportion to the ratio of air and fuel flow to correspondingly move the needle over the scale.

WLADIMIR A. REICHEL.